March 7, 1961　　　F. RIEDL　　　2,973,653
INFINITELY VARIABLE GEAR
Filed Jan. 9, 1957　　　9 Sheets-Sheet 1

March 7, 1961  F. RIEDL  2,973,653
INFINITELY VARIABLE GEAR
Filed Jan. 9, 1957  9 Sheets-Sheet 4

March 7, 1961  F. RIEDL  2,973,653
INFINITELY VARIABLE GEAR
Filed Jan. 9, 1957  9 Sheets-Sheet 8

March 7, 1961 F. RIEDL 2,973,653
INFINITELY VARIABLE GEAR
Filed Jan. 9, 1957 9 Sheets-Sheet 9

Fig.14

United States Patent Office 2,973,653
Patented Mar. 7, 1961

2,973,653

INFINITELY VARIABLE GEAR

Franz Riedl, Richard Strauss Strasse 23, Munich 8, Germany

Filed Jan. 9, 1957, Ser. No. 633,307

Claims priority, application Germany Jan. 19, 1956

17 Claims. (Cl. 74—117)

The present invention relates to new improvements in infinitely variable gears, particularly for motor vehicles, having a drive shaft and a driven shaft coaxial therewith, and connecting means between these shafts which are controlled by suitable control means and adapted to carry out swinging movements.

The gears of this type as known prior to this invention were variable only within a relatively small range. The speed of the driven shaft of such infinitely variable gears could be increased beyond approximately 1400 r.p.m. only if an additional step-up gear was provided between the driven shaft of the variable gear and the shaft which was connected to the elements to be driven. These intermediate step-up gears always had a considerable length and therefore considerably increased the total length of the entire gear system.

It is an object of the present invention to provide an infinitely variable gear which has a very large control range and may be connected either to high-speed or low-speed engines or motors.

Another object of the present invention is to provide an infinitely variable gear which is especially adapted for use as a gear for motor vehicles and particularly automobiles, and may be adjusted both by hand as well as automatically, does not require any clutch, and also operates without requiring the reversal or change of any parts when the direction of rotation of the driven shaft of the motor or engine is being changed.

According to the present invention, these objects are attained, generally speaking, by resiliently mounting the swinging parts of the gear in a radial direction within a member which rotates with the drive shaft, and by connecting these parts with a member which rotates with the driven shaft by suitable elements which engage in a groove in the latter shaft and exert a clamping action upon the walls of such groove.

Further objects, features, and advantages of the present invention will be apparent from the following detailed description thereof, particularly when read with reference to the accompanying drawings, in which—

Fig. 13 shows a cross section taken along line XIII—XIII of Fig. 12; while

Figure 1:
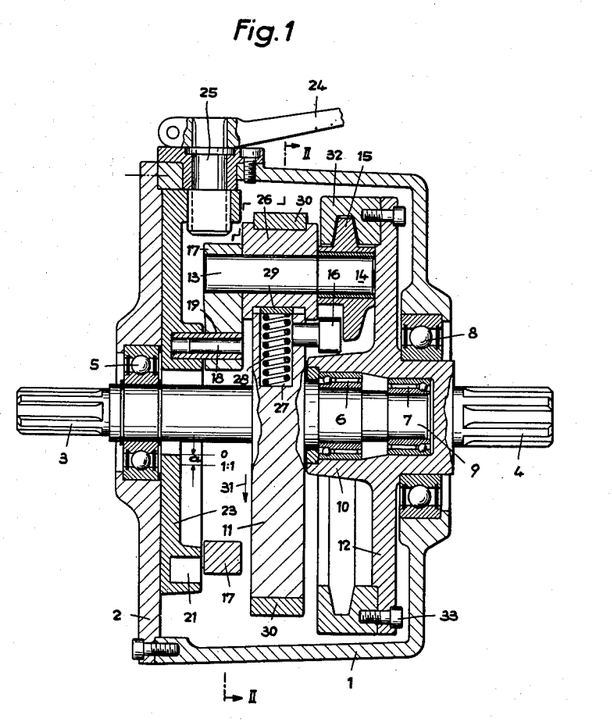
Fig. 1 shows a cross section through an infinitely variable gear according to the invention, the swinging parts of which consist of cranks which, actuated by a control member, move a plurality of clamping members into engagement with the walls of a groove provided in a disk which is secured to the driven shaft so as to transmit the torque of the driving shaft to the driven shaft.
Figure 2:
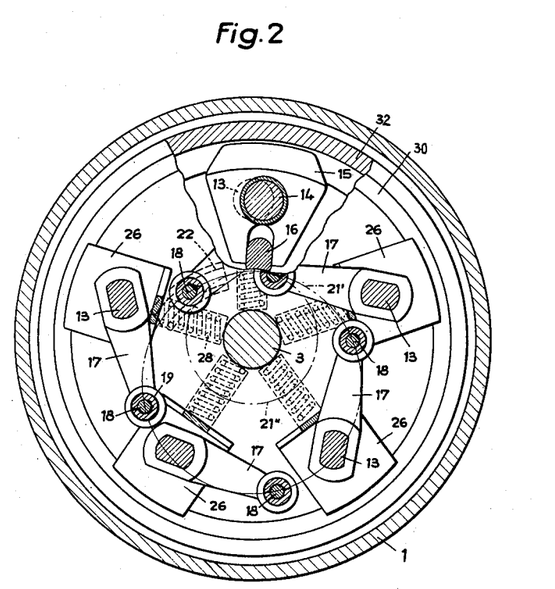
Fig. 2 shows a cross section taken along line II—II of Fig. 1.

Referring to the drawings, and first particularly to Figs. 1 and 2 the infinitely variable gear according to the invention is contained within a housing 1 which is closed at one side by a cover 2 and supports a drive shaft 3 and a driven shaft 4 by means of bearings 5 and 8. The inner end 9 of drive shaft 3 engages into and is supported by the inner end 10 of shaft 4 on bearings 6 and 7. Drive shaft 3 carries a circular disk or wheel 11, while the driven shaft 4 carries a circular disk 12. Both disks preferably form an integral part of the respective shafts. Disk 11 supports a plurality of crank-shaped members, for example, five such members, which are adapted to carry out oscillatory movements and are resiliently mounted within disk 11. Each of these crank-shaped members consists of a pin 13 with an eccentric pivot 14 at one end on which a clamping member 15 is mounted and nonrotatably secured by means of a pin 16, each of which is rotatably mounted in disk 11. The other end of pin 13 carries a crank consisting of an arm 17 and a pin 18 thereon. Each pin 18 preferably carries a bushing 19 consisting of a cylindrical portion and a portion 22 of a segmental shape in accordance with a groove 21 provided in a control disk 23 which is adapted to move back and forth and is manually adjustable by means of a lever 24 through a threaded spindle 25. If lever 24 is turned, for example, about an angle of 160°, control disk 23 will be shifted by a distance $a$, as shown in Fig. 1. The numeral "0" indicates that the driven shaft 4 is at a standstill even though drive shaft 3 rotates. The designation "1:1" indicates that the driven shaft 4 rotates at the same speed as drive shaft 3 if control disk 23 has been shifted by the distance $a$.

Each pin 13 is mounted in a bushing 26 which is acted upon by a spring 28 disposed in a radially extending aperture 27 in disk 11 and engaging with bushing 26 through a washer 29. Bushings 26 are retained on disk 11 by a ring 30, and they are designed so as to be non-rotatable relative to disk 11 and only to be slidable in a radial direction against the action of springs 28.

If control disk 23 is adjusted by means of lever 24 from the position as shown in Fig. 1 in the direction of arrow 31, clamping members 15 are successively brought into engagement with a ring 32 which is secured to disk 12 on the driven shaft 4, for example, by screws 33. In order to illustrate this more clearly, Fig. 2 shows in dot-and-dash lines two circles 21' and 21" wherein circle 21' indicates the circle described by the segmental groove 21, while circle 21" forms the circle of adjustment of the parts which carry out the oscillatory movements. The associated parts should be adjusted so that in the zero position of control disk 23 the two circles 21' and 21" touch each other, as illustrated in Fig. 2, with the result that the driven shaft 4 will stand still even though drive shaft 3 rotates. If control disk 23 is then shifted, circles 21' and 21" will intersect each other. Regardless of whether control disk 23 is in the zero position or in a position differing from the zero position, the oscillatory parts will always carry out an oscillatory movement. However, they will transmit the rotary moment only if by an adjustment of control disk 23, one or two of their members 15 come into engagement with ring 32. In the particular embodiment of the invention as shown in Figs. 1 and 2, the driven shaft 4 will always be properly coupled with and carried along by drive shaft 3 by the engagement of the wedge-shaped clamping members 15 and the corresponding wedge-shaped groove in ring 32. These interengaging parts may, however, also be made of a different design and shape than shown in the drawings.

The associated parts between drive shaft 3 and the driven shaft 4 as shown in Figs. 1 and 2 cooperate with each other in such a manner that the drive shaft and driven shaft are always in a positive connection with each other so that the engine connected to drive shaft 3 may be slowed down when the speed of the parts which are driven by the gear according to the invention is reduced.

Figure 3:
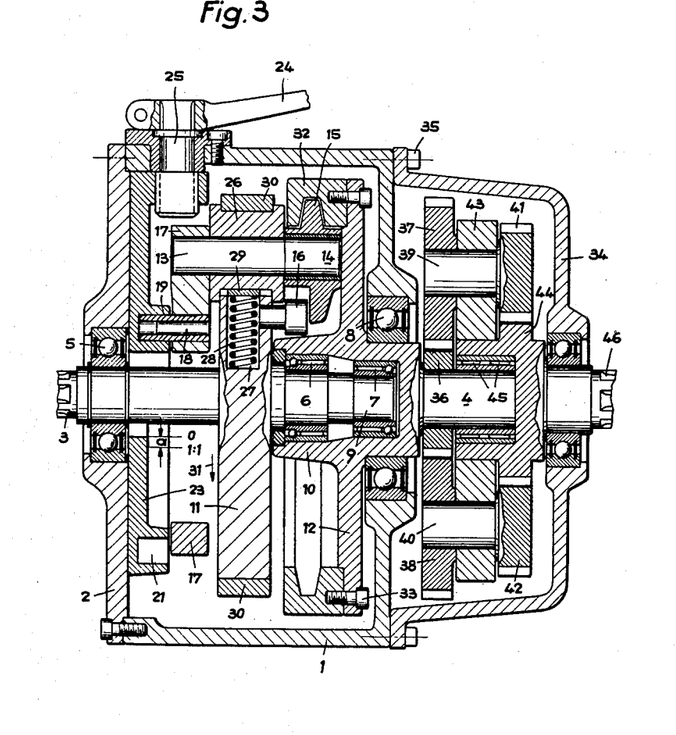
Fig. 3 shows a cross-sectional view similar to Fig. 1, but including an additional gear transmission connected to the infinitely variable gear according to Fig. 1 so as to form a single gear unit with such gear.

It is advisable to provide an intermediate gear between the driven shaft 4 of the variable gear according to Figs. 1 and 2 and the drive shaft of the parts to be driven, for example, the front or rear wheels of an automobile. Such intermediate gear is preferably a planetary gear of a type known as such, the gear wheels of which are disposed within the same plane. The combination of an intermediate gear of this type with an infinitely variable gear according to the invention so as to form a single gear unit is illustrated in Fig. 3. A housing 34 containing the intermediate gear is secured to a main gear housing 1 similar to that shown in Figs. 1 and 2, for example, by bolts 35. The driven shaft 4 carries a pinion 36 which is preferably keyed thereon and engages with a pair of gears 37 and 38. Each of these gears is mounted on a shaft 39 or 40, respectively, which carries at its other end a gear 41 or 42, respectively. In Fig. 3, each shaft 39 and 40 is shown as being integrally secured to the respective gear 41 and 42. Shafts 39 and 40 are rotatably mounted on a disk 43 which, in turn, is rotatably mounted on the hub of a pinion 44. This pinion is mounted on the driven shaft 4 by means of a needle bearing 45, and may be integrally secured to a driven shaft 46.

The operation of this supplementary gear is as follows:

Let us assume, for example, that drive shaft 3 of the variable gear is driven by a motor, for example, the engine of an automobile, at a constant speed of 1000 r.p.m. By adjusting control disk 23, the speed of the driven shaft 4 may then be regulated so as to vary between 0 and 1000 r.p.m. Gears 37, 38 and 41, 42 will idle and constitute a disconnected coupling between shaft 4 and shaft 46.

Figure 4:
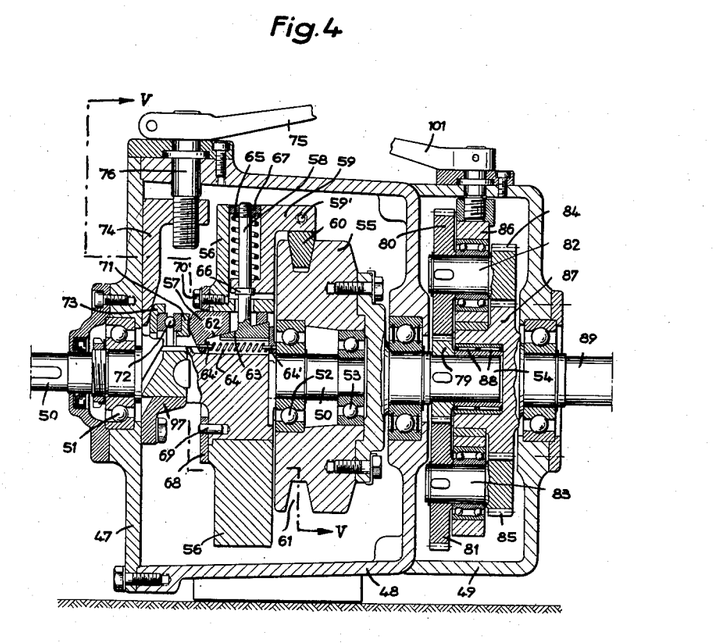
Fig. 4 shows a longitudinal section through a modification of the infinitely variable gear according to the invention, the swinging parts of which consist of a disk rotating with the drive shaft and connecting members within such disk which are adjustable by a control member by means of cooperating wedge-shaped surfaces and provided with wedge-shaped clamping members which are adapted to engage into a groove in a disk mounted on the driven shaft to transmit the rotary motion of the drive shaft thereto.

If shaft 46 is to be driven, it is merely necessary to exert a braking action upon disk 43 by suitable control means, 101 as shown in Fig. 4. Since gears 41, 42 and 37, 38 will then transmit the torque from gear 36 to gear 44, shaft 46 will be driven at a speed different from the speed of shaft 4.

If desired, disk 43 may also be provided with peripheral teeth meshing with one or more gears (not shown) which, in turn, are rotated by a separate motor or by a governor which is acted upon by the infinitely variable gear. Depending upon the direction in which disk 43 is driven, it will then be possible either to increase the speed of the engine for the purpose of exerting a braking action or to increase the speed of the driven shaft 46 if the latter is to run at a higher speed than driving shaft 3.

As it might be regarded as a disadvantage that the intermediate elements between disk 11 on drive shaft 3 and disk 12 on the driven shaft 4 of the embodiments of the invention as shown in Figs. 1 to 3 are also moved when the driven shaft 4 rotates at the same speed as the drive shaft, that is, when the transmission ratio is 1:1, the present invention further provides suitable means for eliminating such disadvantage. According to a further embodiment of the invention as subsequently described and shown in Figs. 4 to 9, both the driving and driven shafts of the infinitely variable gear are again provided with a disk for transmitting the torque from one to the other. The disk on the drive shaft carries a plurality of clamping members which are supported therein so as to be adjustable in a radial direction of the disks and are adapted to engage with the disk on the driven shaft. For this purpose, the disk on the drive shaft also contains a corresponding number of connecting members which are resiliently connected to the respective clamping members and have at one end an inclined or wedge-shaped portion extending transverse to the length of each connecting member. Each of these wedge-shaped portions is in engagement with a similarly inclined pressure member which is adjustable by suitable control means so as to move in the axial direction of the drive shaft independently of the other pressure members.

Thus, as shown in Figs. 4 to 9, a housing 48 which is closed by a cover 47 contains the principal elements of the infinitely variable gear according to this modification of the invention. A second housing 49 is secured to the rear end of housing 48 and contains a gear system substantially similar to that shown in Fig. 3.

Figure 5:
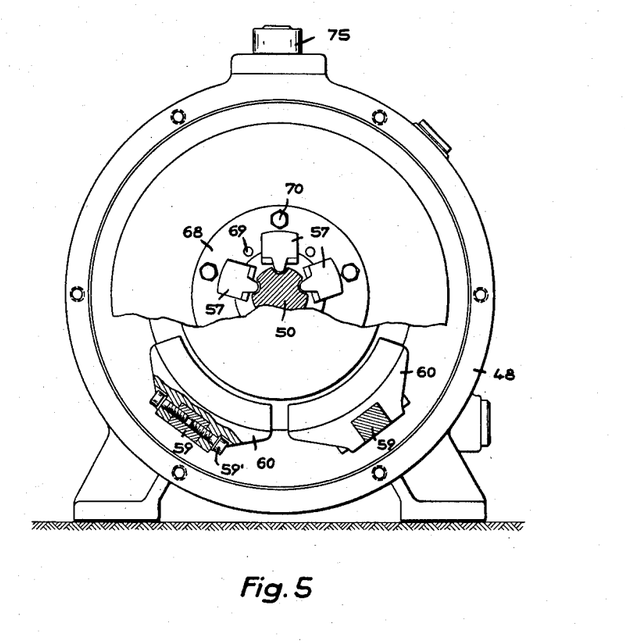
Fig. 5 shows a cross section taken along line V—V of Fig. 4.

A drive shaft 50 which is to be connected to the motor or engine is rotatably mounted on a ball bearing 51 within cover 47 and ball bearings 52 and 53 within a disk 55 which is secured to the driven shaft 54. Drive shaft 50 also has a disk 56 secured thereto in which a plurality of wedge-shaped pressure members 57, connecting members 58, and supporting members 59 are mounted. Each supporting member 59 carries a wedge-shaped member 60 which is adapted to transmit the torque of drive shaft 50 to the driven shaft 54 by engaging into a similarly wedge-shaped groove 61 in disk 55 on shaft 54. Members 59 and 60 are secured to each other by screws 59', as shown in Fig. 5. In this particular embodiment of the invention, there are five pressure members 57 provided, each of which has an inclined surface 62 which engages with a similarly inclined surface 63 on the corresponding connecting member 58. Each pressure member 57 is acted upon by a spring 64, which is guided by pins 64', and surrounds the lower end of the shaft portion of the respective connecting member 58 so as to be slidable parallel to the axis of drive shaft 50 so that by the engagement of surfaces 62 and 63 member 58 will be drawn inwardly. Since each connecting member 58 is resiliently connected through a spring 65 with a supporting member 59 which rests on a shoulder 66 on member 59, such inward movement of connecting member 58 will also result in a resilient engagement of the wedge-shaped clamping members 60 in grooves 61 of disk 55. The tension of spring 65 and thus the resilient engagement of member 60 with disk 55 may be adjusted by a nut 67.

Figure 6:
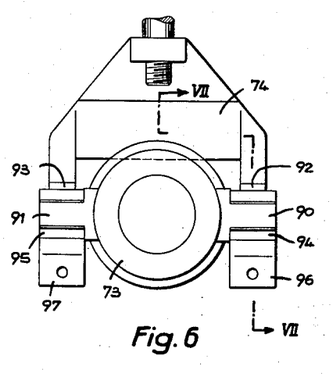
Fig. 6 shows a plan view of the pivoting member and the control member for adjusting said pivoting member as shown in Fig. 4.
Figure 7:
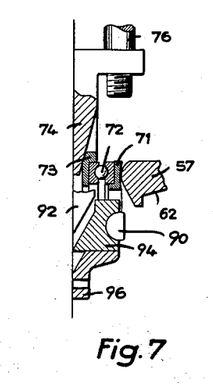
Fig. 7 shows a cross section taken along line VII—VII of Fig. 6 and illustrates the elements shown in Fig. 6 in the idling position.
Figure 8:
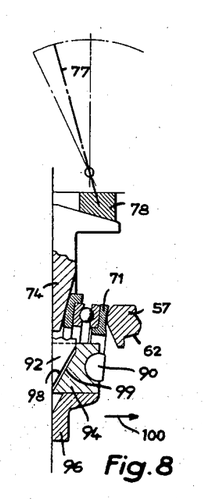
Fig. 8 shows a view similar to Fig. 6 with the elements in a position in which they are adjusted to a certain intermediate speed.
Figure 9:
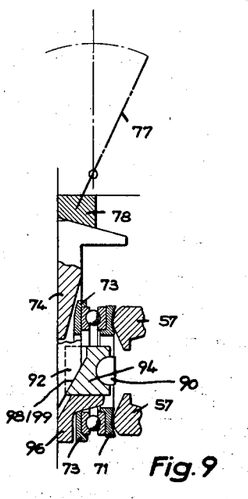
Fig. 9 shows another view similar to Fig. 6 with the elements in a position corresponding to a transmission ratio of 1:1.

In this embodiment of the invention as illustrated in Figs. 4 to 9 it is assumed that drive shaft 50 and disk 56, which are built as two separate elements, are positively connected to each other by a plate 68, pins 69, and screws 70. Pressure members 57 are constantly in engagement with a thrust ring 71 which is supported by a pivotable member 73 through a ball bearing 72. An inclined slide member 74 is adapted to pivot member 73 from its normal position vertical to the axis of drive shaft 50 as shown in Fig. 9 to different inclined positions as shown in Fig. 8. Slide member 74 is preferably of a bifurcated shape, as shown in Fig. 6, and adjustable in a vertical direction by means of a lever 75 and screw spindle 76. In place of lever 75 and screw spindle 76, it is also possible to adjust the vertical position of slide member 74 by wedge action by sliding a wedge-shaped member 78 along the inclined upper surface of member 74 by means of a two-armed lever 77, as indicated in Figs. 8 and 9.

The driven shaft 54 which projects from housing 48 into housing 49 carries a gear 79 which is preferably keyed thereon. This gear 79 is in mesh with two planetary gears 80 and 81, each of which is mounted at one end of a shaft 82 or 83, respectively, the other end of which carries a gear 84 or 85, respectively, which may be integral with the respective shaft. Shafts 82 and 83 are rotatably mounted, preferably on ball bearings, in a carrier disk 86 which, in turn, is rotatably mounted on the hub of a gear 87. This gear 87 is secured to and preferably integral with the output shaft 89, and mounted on a needle bearing 88 on the driven shaft 54 of the variable gear.

The operation of the gear system according to Figs. 4 to 9 is as follows:

If slide member 74 is adjusted by lever 75 or 77 so that member 73 together with thrust ring 71, which are pivotable about a pair of trunnions 90, 91, lie within a plane vertical to the axis of drive shaft 50, this shaft will rotate, while the driven shaft 54 will be standing still. In other words, the variable gear will then be in the neutral or idling position. If slide member 74 is then shifted from the idling position shown in Fig. 7 toward drive shaft 50, member 73 as well as ring 71 are pivoted to an inclined position. Depending upon the degree of inclination of thrust ring 71, only one or several pressure members 57 will then be shifted in the direction toward connecting members 58, while springs 64 on the other pressure members 57 will push these members in the opposite direction following the pivotal movement of the lower half of ring 71 away from disk 56. If, for example, only one pressure member 57 is shifted toward the respective connecting member 58 so that its inclined surface 62 slides along the inclined surface 63 of member 58, the latter is shifted in the direction toward the axis of drive shaft 50, whereby through the action of spring 65 the clamping member 60 engages into groove 61 in disk 55 and takes along the latter during the periods of such engagement. This clamping member 60 then again disengages from the walls of groove 61 and thus from disk 55 as soon as the next following member 60 positively engages therewith.

Fig. 8 illustrates the relative position of the control members of the gear as above described when adjusted to a certain intermediate transmission ratio, while Fig. 9 shows the relative position of the control members when adjusted to the highest possible speed, that is, to the maximum transmission ratio of 1:1.

Since the bifurcated member 74 has two inclined projections 92 and 93, and trunnions 90 and 91 are mounted on brackets 96 and 97, respectively, by means of bearing members 94 and 95, the engagement of the inclined surfaces 98 and 99 with members 92, 93 and 96, 97, respectively, will shift members 94 and 95 in the direction of arrow 100, as shown in Fig. 8. This, in turn, will again move bearing 72 and thrust ring 71 into a plane vertical to the axis of drive shaft 50 without requiring slide member 74 to be moved back to the position shown in Fig. 7.

A brake member 101 can be operated to exert a braking action on planetary carrier 86 so that torque is transmitted to the outward shaft.

The proper adjustment of clamping members 60 according to Figs. 4 to 9 requires a certain amount of experience since their engagement with the walls of groove 61 must be quite uniform. Furthermore, if the extent of the movement of clamping members 60 is too large, there is always the danger that a creeping movement will be transmitted.

It is a further object of the present invention to avoid these disadvantages by making the thrust ring of the bearing which engages with the pressure members to be axially adjustable independently of the pressure members. For this purpose, it is possible either to provide a control member which is adjustable in a radial direction relative to the drive shaft or to provide control members which are movable both in the radial and axial directions, while the bearing is only adjustable in the axial direction relative to the drive shaft. The first-mentioned possibility is illustrated in the embodiment of the invention, as shown in Fig. 10, while the second possibility is demonstrated in a further embodiment as shown in Figs. 11 to 14.

Figure 10:
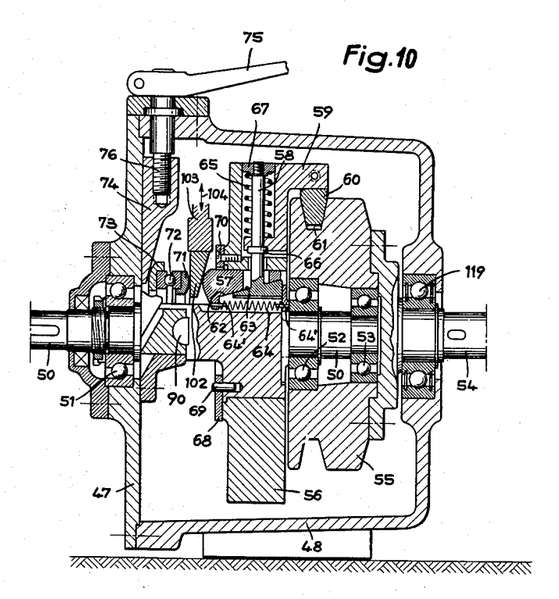
Fig. 10 shows a longitudinal section through another modification of the infinitely variable gear according to the invention similar to that shown in Figs. 4 to 9 but with a control member which is adjustable in a radial direction between the thrust ring and the pressure members.

The embodiment according to Fig. 10 differs substantially from that shown in Fig. 4 by the provision of wedge-shaped members 102 between thrust ring 71 and pressure members 57, and of a control member 103 for moving members 102 back and forth in a direction as shown by arrow 104. If the gear system is provided with five pressure members 57, there should also be five wedge-shaped members 102. After disk 55, disk 56, and the parts mounted in disk 56 have been built, these parts are assembled so that clamping members 60 engage into groove 61 in disk 55. The surfaces of pressure members 57 which engage with the inclined surfaces of the wedge-shaped members 102 when drive shaft 50 rotates will then lie within two or more parallel planes transverse to the axis of the drive shaft, rather than within a single plane. It is then only necessary to tool the surfaces of pressure members 57 which are facing toward members 102 so that all surfaces lie within a common plane transverse to the axis of drive shaft 50. It will thus be insured that all clamping members 60 will fully and uniformly engage in groove 61 and that a positive connection between drive shaft 50 and the driven shaft 54 will thus be attained. After the other parts of the gear, for example, the five wedge-shaped members 102 which are associated with the five pressure members 57, the thrust ring 71, etc., have been properly assembled in housing 48, it will then be possible to withdraw clamping members 60 to a slight extent out of groove 61 by manipulating lever 75 so as to shift thrust ring 71 in a direction toward pressure members 57. For this purpose, thrust ring 71 is shifted toward pressure members 57 only to such an extent that disk 55 on shaft 54 will rotate easily when the latter is turned from the outside of housing 48. As soon as shaft 54 can be freely rotated, lever 75 should be secured in a fixed position. If after a long period of operation pressure members 60 have become worn, it is only necessary to turn handle 75 so as to reset thrust ring 71 to the proper position to compensate for such wear. Control member 103 encloses and acts simultaneously upon all of the wedge-shaped members 102, and it is moved back and forth by means known as such in the direction as shown by arrow 104. By thus shifting control member 103 it is possible while drive shaft 50 rotates either to stop the rotation of the driven shaft 54 or to rotate the same at any desired speed up to the speed of drive shaft 50. The supplementary gearing 80—87 is not shown in Fig. 10, but it will be understood that additional control members 102 can be provided in the arrangement of Fig. 4.

In the embodiment of the invention as shown in Figs. 11 to 14, those parts which are similar to or similarly acting as the corresponding parts in the last-described embodiment are identified by the same reference numerals as in Fig. 10. The wedge-shaped members 102 are here replaced by wedge-shaped members 102', each of which is acted upon by a compression spring 105 on a pin 106. This pin 106 is slidable within a groove 107 in drive shaft 50' in the axial direction of the latter. Members 102' may be adjusted in a direction vertical to the axis of shaft 50' as shown by arrow 104 by a control member 103' which may be moved upwardly or downwardly on a screw spindle 107 by rotation of a handwheel 108.

The embodiment according to Figs. 11 to 14 differs from that shown in Fig. 10 by the provision of a plurality of wedge-shaped members 109 within disk 56' in accordance with the number of wedge-shaped members 102'. Members 59 and 60 are replaced by members 110, the two oppositely inclined surfaces of which are provided with a friction coating 111 which is adapted to engage in groove 61' of disk 55' with the inclined walls thereof. Instead of being held in place by an adjustable nut 67, as shown in Fig. 10, the outer end of each spring 65' which is guided on a pin 58' is secured relative to disk 56' by a plate 67' which is mounted on disk 56' by a screw 112. Springs 65' therefore always tend to force members 110 out of groove 61' in disk 55. Members 110 are brought into engagement with the walls of groove 61' in a manner similarly as described with reference to Fig. 10 by adjusting lever 75' so as to shift thrust ring 71' until disk 55' can rotate freely. Lever 75' is then secured in a fixed position. If handwheel 108 is then turned in one direction, spindle 107 will move control member 103' toward drive shaft 50' and thereby also shift the wedge-shaped members 102' in the same direction. Since springs 65' urge members 110 in the direction toward drive shaft 50', the other wedge-shaped members 109 remain in engagement with members 102' and slide toward the left until members 110 and 55' are in positive engagement with each other so that drive shaft 50' is directly connected to the driven shaft 54'. The greater the extent is at which control member 103' is thus adjusted in the direction toward the axis of shaft 50', the longer members 110 will remain in engagement with disk 55'. Thus, by adjusting control member 103', the speed of the driven shaft 54' may be varied anywhere between a full stop and the speed of drive shaft 50'.

Figure 14:
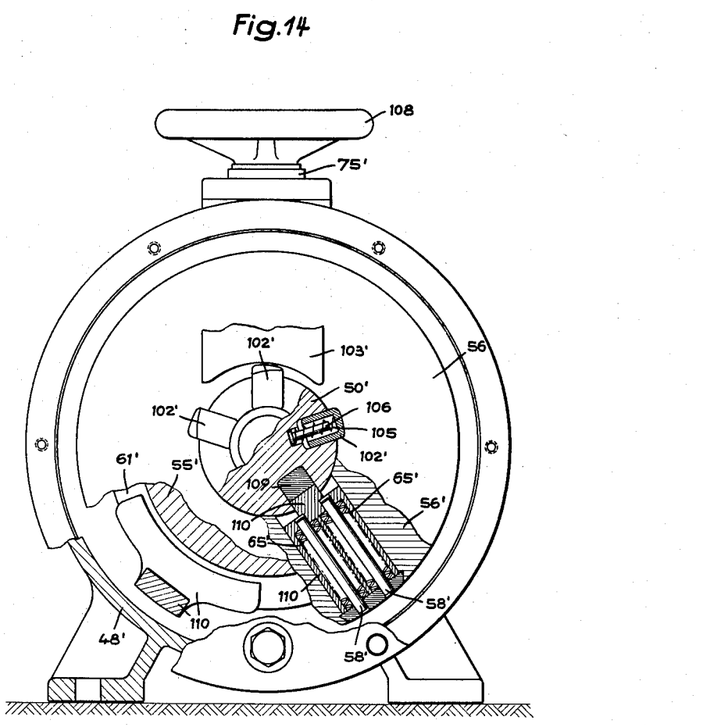
Fig. 14 shows a front view, partly in section, of the infinitely variable gear as shown in Fig. 11 but with the cover removed therefrom.

As illustrated in Fig. 14, each member 110 may also be provided with two springs 65' and thus also with two pins 58 for guiding the same.

Figure 11:
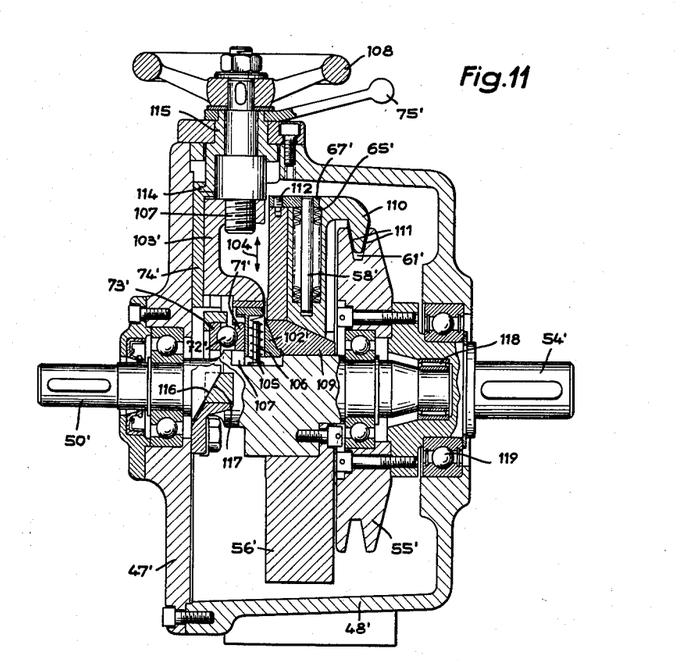
Fig. 11 shows a longitudinal section through a further modification of the infinitely variable gear according to the invention with adjusting and control means of a different design than those shown in Fig. 10.
Figure 12:
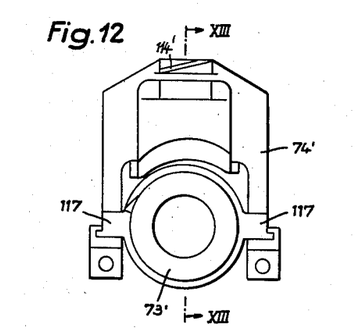
Fig. 12 shows a front view of the thrust ring and the control member provided between the thrust ring and the pressure members as shown in Fig. 11.
Figure 13:
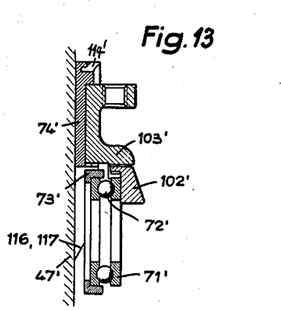

Since the adjustment of thrust ring 71 according to the embodiment as shown in Fig. 11 differs slightly from that shown in Fig. 10, a short explanation of the elements for controlling thrust ring 71 may be desirable. While bearing 72 in Fig. 10 is pivoted about trunnions 90 and 91 for moving thrust ring 71 in the direction toward pressure members 57, bearing 72' in Fig. 11 is shifted only in the direction toward pressure members 102'. Since lever 75' is secured to a bushing 115 and a lug 114 on bushing 115 engages in a spiral groove 114 in the bifurcated member 74', lever 75' when turned in one direction will shift member 74' in the direction toward drive shaft 50' so that the wedge-shaped surfaces 116 on member 74' will engage with the corresponding surfaces 117 on ring 73' and thereby shift bearing 72' in the direction toward wedge members 102'.

Insofar as the principles of the invention are concerned, it is immaterial whether the driven shaft 54 is connected to disk 55' in the manner as shown in Fig. 10 or in that shown in Fig. 11. The end of drive shaft 50 or 50', respectively, may either be supported within disk 55 by a ball bearing 53, as shown in Fig. 10, or within the driven shaft 54', for example, by a needle bearing 118, as shown in Fig. 11, while this shaft 54 or 54', in turn, may be supported by a roller bearing 119 in the outer end of housing 48 or 48', respectively. Of course, the two embodiments shown in Figs. 10 and 11, respectively, are generally combined with a supplementary gear means as shown in Figs. 3 and 4, but these gear means are omitted in Figs. 10 and 11, since these figures are intended to show modifications of the infinitely variable transmission.

Although my invention has been illustrated and described with reference to the preferred embodiments thereof I wish to have it understood that it is in no way limited to the details of such embodiments, but is capable of numerous modifications within the scope of the appended claims.

Having thus fully disclosed my invention, what I claim is:

1. An infinitely variable gear comprising a drive shaft, a driven shaft means coaxial with said drive shaft, a disklike member secured to said drive shaft and rotatable therewith, a plurality of members resiliently mounted within said disklike member for movement independently of each other in a radial direction of said drive shaft and adapted to carry out swinging movements, non-rotating adjustable control means for actuating selected swinging members during rotation of said drive shaft, and clamping members on said swinging members adapted to engage with said driven shaft means to transmit the torque of said drive shaft thereto when the associated swinging member is actuated.

2. An infinitely variable gear comprising a drive shaft, a driven shaft coaxial with said drive shaft, a disklike member secured to said drive shaft and rotatable therewith, a disklike member secured to said driven shaft and having an annular groove therein, a plurality of members intermediate said disklike members and resiliently mounted within said disklike member on said drive shaft for movement independently of each other in a radial direction of said drive shaft and adapted to carry out swinging movements, and clamping members on said swinging members adapted to engage into said groove and with the walls thereof to transmit the torque of said drive shaft to said driven shaft when the associated swinging member is actuated, and non-rotating adjustable control means for actuating selected swinging members during rotation of said drive shaft.

3. An infinitely variable gear as defined in claim 1, wherein said swinging members comprise a plurality of cranks, each of said cranks having a crank pin and a pin eccentrically secured to said crank pin, each of said clamping members being mounted on one of said eccentric pins, said control means including a member in engagement with the free end of each of said cranks and adapted to control the swinging movement of said cranks, and means for adjusting the position of said last member.

4. An infinitely variable gear as defined in claim 3, wherein said control member comprises a disk, said disk having an annular groove therein extending eccentrically to the axis of said drive shaft, said free end of each of said cranks engaging into said eccentric groove and being guided thereby.

5. An infinitely variable gear as defined in claim 3, wherein said control member comprises a disk, said disk having an annular groove therein extending eccentrically to the axis of said drive shaft, and a plurality of slide members slidably guided within said groove and each being secured to said free end of each of said cranks.

6. An infinitely variable gear as defined in claim 4, wherein said disklike member comprises a disk fixed on said drive shaft, a plurality of bearing members for rotatably mounting each of said cranks, and means for resiliently mounting each of said bearing members within said disk on said drive shaft for movement in the radial direction of said drive shaft.

7. An infinitely variable gear as defined in claim 6, wherein said disk on said drive shaft has a plurality of recesses therein extending radially to the axis of said drive shaft and each being open at its outer end, said bearing members being slidably mounted within said recesses, said disklike member including a plurality of springs within said disk and acting upon each of said bearing members, and a ring on the periphery of said disk for retaining said bearing members within said recesses and on said disk.

8. An infinitely variable gear as defined in claim 2, wherein each of said members within said disk on said drive shaft forms a connecting member having a wedge-shaped surface extending transverse to the length of said member, a plurality of pressure members each having a wedge-shaped surface engaging with the corresponding surface of one of said connecting members, said control means being adapted to engage said pressure members independently of each other and being adjustable in the axial direction of said drive shaft, and at least one spring resiliently connecting each of said connecting members with each of said clamping members.

9. An infinitely variable gear as defined in claim 8, wherein said control means further comprise a thrust ring adapted to engage with said pressure members, means for pivoting said thrust ring from a normal position vertical to the axis of said drive shaft to different inclined positions, and a plurality of springs each acting upon one of said pressure members tending to move the same away from said connecting members and toward said thrust ring.

10. An infinitely variable gear as defined in claim 9, further comprising a ball bearing connected to said pivoting means and pivotable thereby, said thrust ring being secured to said ball bearing.

11. An infinitely variable gear as defined in claim 9, wherein said pivoting means comprise a slide member movable in a direction toward said drive shaft substantially radially thereof for pivoting said thrust ring to different inclined positions, a spindle threadedly connected to said slide member, and a lever on said spindle adapted to be turned for moving said slide member to adjust the inclined position of said thrust ring.

12. An infinitely variable gear as defined in claim 11, further comprising two bearing members adapted to be engaged by said slide member to move said thrust ring into a position in which all of said pressure members are actuated to move all of said clamping members into a firm engagement with said disk on said driven shaft.

13. An infinitely variable gear as defined in claim 12, wherein said slide member has two wedge-shaped surfaces, each being adapted to engage with a corresponding wedge-shaped surface on each of said bearing members.

14. An infinitely variable gear as defined in claim 8, further comprising means for adjusting said thrust ring in the axial direction of said drive shaft.

15. An infinitely variable gear as defined in claim 8, further comprising wedge-shaped members intermediate said thrust ring and said pressure members, and a control member for adjusting said last members in both the axial and radial directions relative to said drive shaft, said control member being movable only in the radial direction.

16. An infinitely variable gear as defined in claim 15, wherein said drive shaft has a plurality of grooves therein, each of said last wedge-shaped members being mounted within one of said grooves, and a spring within each of said grooves and acting upon one of said wedge-shaped members tending to maintain said member in engagement with said control member.

17. An infinitely variable gear as defined in claim 2, wherein said clamping members form an integral portion of at least some of the members mounted within said disk on said drive shaft.

References Cited in the file of this patent

UNITED STATES PATENTS

| 1,180,952 | Staude | Apr. 25, 1916 |
| 1,274,056 | Denman-Jones | July 30, 1918 |
| 1,297,439 | Bugher | Mar. 18, 1919 |
| 1,832,382 | Hall et al. | Nov. 17, 1931 |
| 2,126,294 | Timmermann | Aug. 9, 1938 |
| 2,346,752 | Hall et al. | Apr. 18, 1941 |

FOREIGN PATENTS

| 374,335 | Germany | Apr. 23, 1923 |
| 426,136 | Great Britain | Mar. 28, 1935 |
| 514,249 | Great Britain | Nov. 2, 1939 |